United States Patent
Newman et al.

(10) Patent No.: US 11,106,736 B1
(45) Date of Patent: Aug. 31, 2021

(54) FUZZY SEARCH OF GRAPH DATABASE

(71) Applicant: Wells Fargo Bank, N.A., San Francisco, CA (US)

(72) Inventors: David Newman, Walnut Creek, CA (US); Omar B. Khan, Richmond, VA (US); Nathan Anthony Susanj, York, PA (US); Alexander Joseph Kalinowski, Philadelphia, PA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 46 days.

(21) Appl. No.: 16/549,202

(22) Filed: Aug. 23, 2019

Related U.S. Application Data

(60) Provisional application No. 62/721,977, filed on Aug. 23, 2018.

(51) Int. Cl.
| | |
|---|---|
| *G06F 16/903* | (2019.01) |
| *G06F 16/955* | (2019.01) |
| *G06F 16/901* | (2019.01) |
| *G06F 16/28* | (2019.01) |
| *G06N 3/04* | (2006.01) |
| *G06F 40/30* | (2020.01) |

(52) U.S. Cl.
CPC .......... *G06F 16/903* (2019.01); *G06F 16/284* (2019.01); *G06F 16/9024* (2019.01); *G06F 16/955* (2019.01); *G06F 40/30* (2020.01); *G06N 3/04* (2013.01)

(58) Field of Classification Search
CPC .... G06F 16/903; G06F 16/955; G06F 16/284; G06F 16/9024; G06F 40/30
See application file for complete search history.

(56) References Cited

U.S. PATENT DOCUMENTS

| | | | |
|---|---|---|---|
| 2013/0151238 A1* | 6/2013 | Beaurpere | G06F 40/242 704/9 |
| 2019/0155877 A1* | 5/2019 | Sharma | G06F 40/253 |

OTHER PUBLICATIONS

Chen, Muhao, "Learning Knowledge Graph Embeddings for Natural Language Processing", (Winter 2017), 57 pgs.
Garbe, Wolf, "1000x Faster Spelling Correction algorithm (2012)", [Online]. Retrieved from the Internet: <URL: http://blog.faroo.com/2012/06/07/irnproved-edit-distance-based-spelling-correction>, (Jun. 6, 2012), 7 pgs.
Grover, Aditya, et al., "node2vec: Scalable Feature Learning for Networks", KDD, (Jul. 3, 2016), 10 pgs.
(Continued)

*Primary Examiner* — Truong V Vo
(74) *Attorney, Agent, or Firm* — Schwegman Lundberg & Woessner, P.A.

(57) ABSTRACT

A method may compiling, using at least one processor, a corpus of training data by obtaining, for each respective concept object in an ontology, a respective concept label and respective annotations describing the respective concept object; generating a vocabulary of terms based on the corpus of training data; training a semantic model using the corpus of training data and the vocabulary of terms, wherein input features for the semantic model are based on context words in proximity to a term in the vocabulary of terms; and storing a set of word embeddings for the vocabulary of terms based on the trained semantic model.

17 Claims, 8 Drawing Sheets

(56) References Cited

OTHER PUBLICATIONS

Mikolov, Tomas, et al., "Distributed Representations of Words and Phrases and their Compositionality", arXiv:1310.4546v1 [cs.CL], (Oct. 16, 2013), 9 pgs.

Norvig, Peter, "How to Write a Spelling Corrector", [Online]. Retrieved from the Internet: <URL: http://norvig.com/spell-correct.html>, (2016), 10 pgs.

Ristoski, Peter, et al., "RDF2Vec: RDF Graph Embeddings and Their Applications", IOS Press, [Online]. Retrieved from the Internet: <URL: http://www.semantic-web-journal.net/system/files/swj1495>, (2016), 25 pgs.

\* cited by examiner

FUZZY SEARCH OF GRAPH DATABASE

RELATED APPLICATIONS

This patent application claims the benefit of U.S. Provisional Patent Application Ser. No. 62/721,977, titled "FUZZY SEARCH OF GRAPH DATABASE," filed Aug. 23, 2018, which is hereby incorporated by reference in its entirety.

BACKGROUND

An ontology may be a taxonomy of concepts for a given field different fields may use different ontologies. The ontology may identify types (e.g., concept objects), properties, and interrelationships between the objects. In some examples, the definition of an ontology is described and stored as a schema at a network-accessible uniform resource identifier (URI).

A graph database may be used for storing a representation of an ontology. Nodes of the database may represent objects, edges may connect the nodes to indicate a relationship, and properties may indicate information about the edges and nodes. A triplestore (sometimes referred to a resource description framework (RDF) store) is a type of graph database often used for semantic data that conforms to the subject-predicate (or property)-object format.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be taken by components in response to different variable values (e.g., thresholds, user preferences, etc.). As a matter of convenience, this disclosure does not always detail where the variables are stored or how they are retrieved. In such instances, it may be assumed that the variables are stored on a storage device accessible by the component via an API or other program communication method. Similarly, the variables may be assumed to have a default values should a specific value not be described. User interfaces may be provided for an end-user or administrator to edit the variable values in some instances.

As indicated in the Background, an ontology may be used as a taxonomy for a given field (e.g., medical or financial). As a simple example, consider a schema for a Person object. The schema may include a number of entries that define the properties (sometimes referred to as relationships, slot-value types) of a Person object such as "given name," "height," "weight," etc., and the properties may also have expected types. Thus, the "height" property may have a value-type of a number whereas "given name" has a string value type. The expected type of an object may be another object. For example, a property of "knows" may have an expected type of Person. Accordingly, the data string "Alice knows Bob" can be thought of as two Person objects with the Alice having the "knows" property.

Another way to consider ontologies is using a "Subject, Predicate, Object" (S-P-O) format. Using the example of "Alice knows Bob," Alice is the subject, the predicate is "knows," and the object is "Bob." With reference back to our example Person schema, the predicate is the property in the schema and the expected type is the object. In other words, a schema may semantically define valid relationships between multiple objects.

Figure 1:
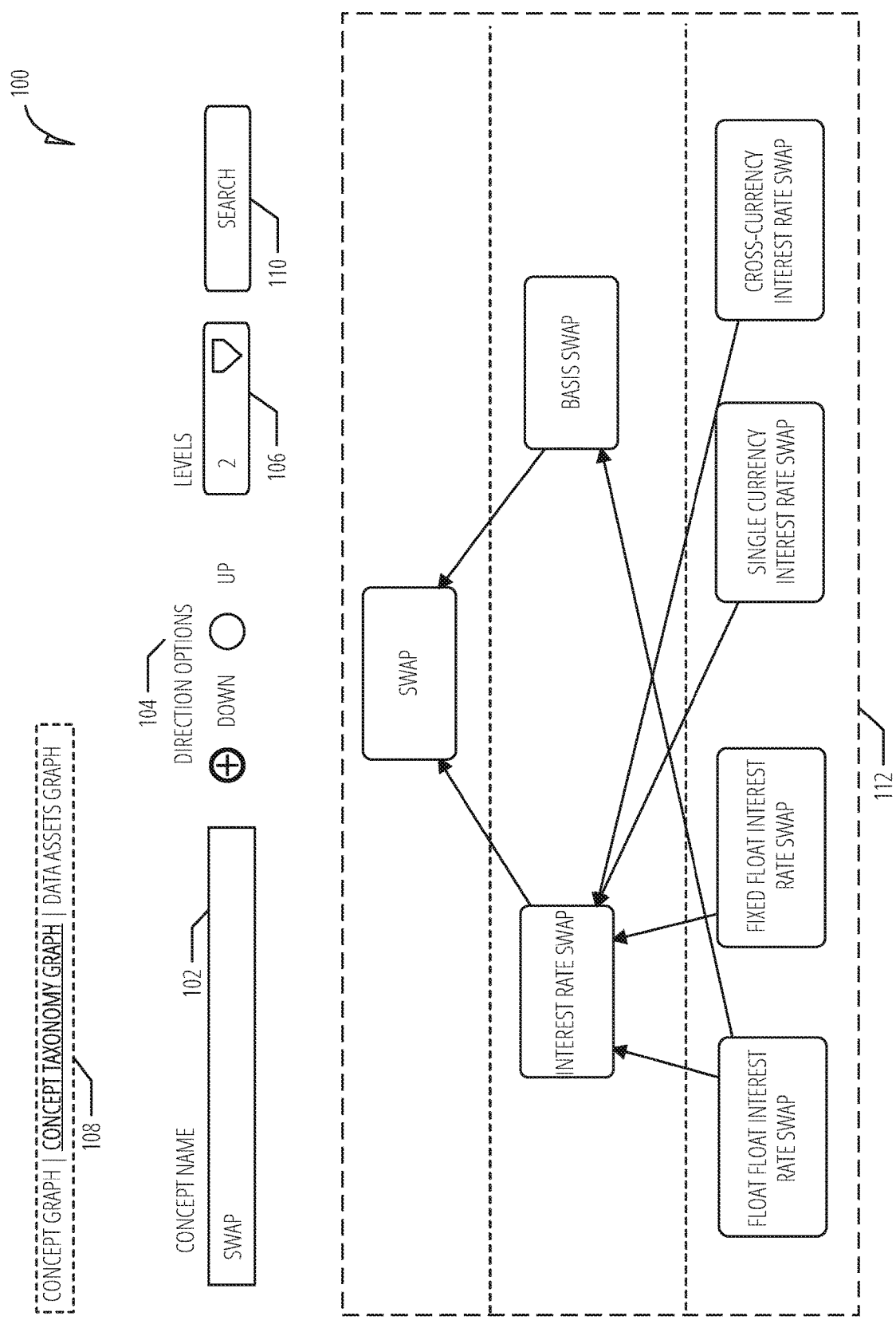
FIG. 1 is a taxonomy browser user interface, according to various examples.
Figure 2:
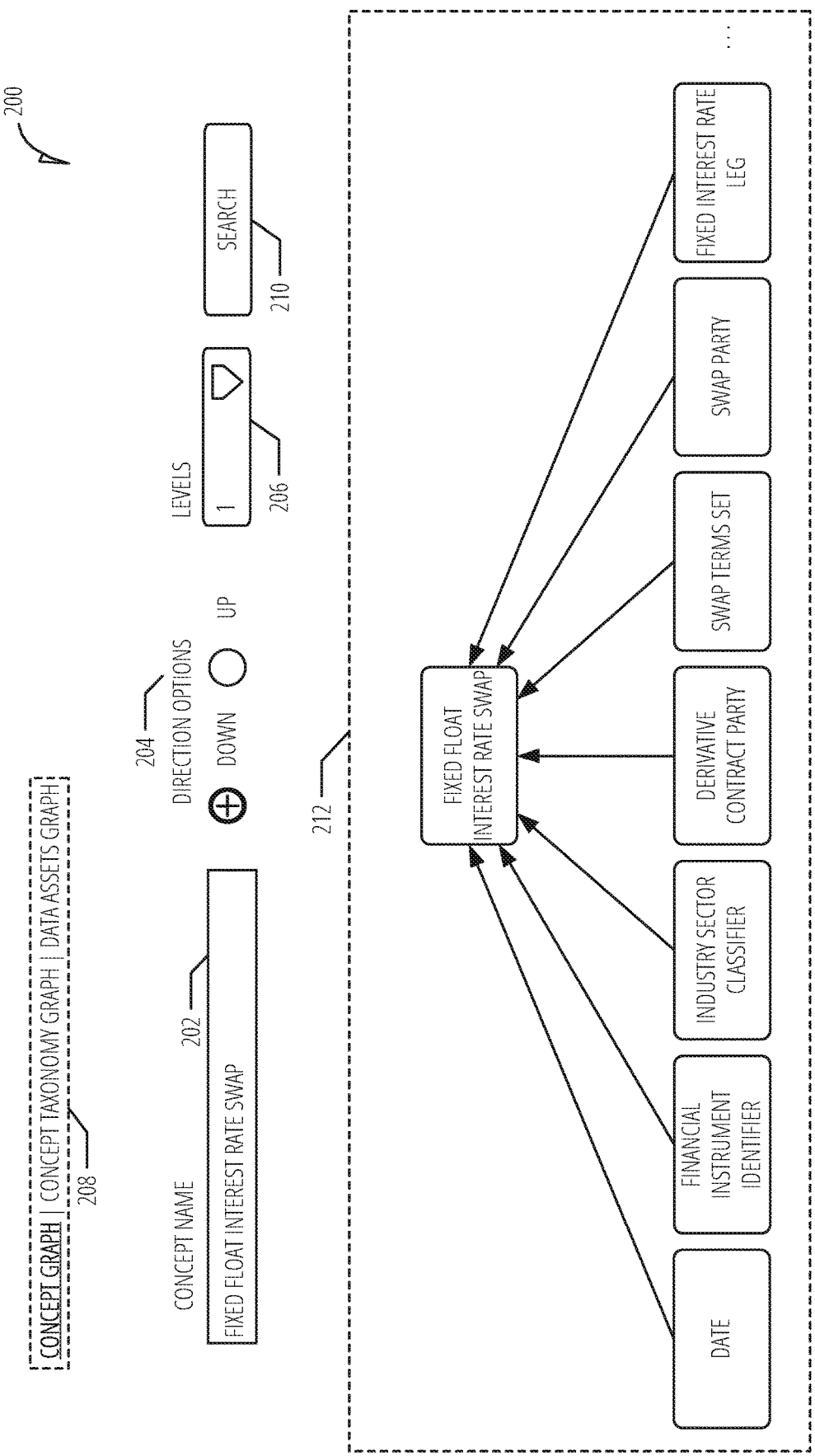
FIG. 2 is a concept relations user interface, according to various examples.

A user may interact with data in an ontology in a variety of ways. For example, the user may search for a concept in an ontology. In response, different visualizations of the concept may be presented as a concept taxonomy graph as shown in FIG. 1 or as a concept graph as shown in FIG. 2.

Using such visualizations, however, may require knowing the label (e.g., the name) of the concept in the ontology. A problem with ontologies is that it is likely that the chosen label for a concept is not the only label a concept is known by. In some instances, an ontology has annotations for a concept that may include synonyms. Yet, even then it is not guaranteed that all the synonyms will be included resulting in a search with no results.

The problem becomes compounded when discussing underlying infrastructure assets (e.g., columns in a database table) that store data related to a concept. For example, in a financial ontology there may be a concept object with a label "credit card account," but different lines of business in a company may label, in database tables, the concept as "credit card ID" or "credit card identifier" or "credit card number," etc.

In view of the above problems, an automated system may be used that iterates through concepts, and their respective annotations, in an ontology to develop a corpus of training data. The corpus of training data may be fed into a shallow neural network to generate a set of word embeddings. A word embedding may be a vector representation of the word in N-dimensional space where N is the number of neurons in the hidden layer of the neural network. As discussed further herein, the closer two words or phrases are in vector space according to cosine similarity (e.g., distance between the vectors) the more semantically similar they are. Accordingly, when the user searches for a word that is not the concept label of a concept object in an ontology, the system may present suggestions (e.g., "Did you mean . . . ") based on the cosine similarity with concept labels in the ontology.

Using a smaller set of training data may, counter-intuitively, provide more accurate word embeddings than using a larger set of training data. For example, a larger set of training data may include uses of a concept term in contexts not relevant to the concept definition in the ontology. In contrast, by using a corpus of training data that is explicitly tied to the ontology, the system may ensure that only relevant data is include. Consider that the neural network is trained using the larger set of data. In such an instance, the word embeddings would also be different. Thus, when giving suggestions to a user the set of suggestions would be different and likely less relevant than the suggestions when using the corpus of training data described above. A more detailed description of generating and using the word embeddings to make suggestions to incorrect (e.g., misspelled or concepts not present in the ontology) searches is described when discussing FIG. 6 and FIG. 7.

At a basic form, an ontology may be structured as a directed acyclic graph and stored in a graph database. Each node in the directed acyclic graph may represent a concept object in the ontology. A concept object may have a "is a" direct property relationship to one or more other concept objects that are represented as vertices in the directed acyclic graph. If concept object B "is a" concept object A, then concept object B may be considered a subclass of concept object B. Similarly, concept object A may be a superclass concept object of concept object B. The relationships and concept objects may be stored in a graph database. Properties from a superclass of a concept object may be inherited to the concept object.

A concept object may also be semantically related to other concept objects or attributes. Unlike direct "is a" relationship, semantically related objects do not automatically inherit properties from their semantic links. For example, a Person object may have a property of "works for" a Company object, but the Person object may not inherit properties of the Company object.

In some examples, a more specific type of a graph database, known as a triplestore (also sometimes referred to a resource description framework (RDF) database)), is used to store the semantic data (e.g., relationships) for the ontology. Triples conforming to the S-P-O format may be stored in the triplestore and be expressed using the World Wide Web Consortium's (W3C) RDF protocol in various examples. The W3C also defines a Web ontology Language (OWL) semantic web language. RDF/OWL conforming ontologies may be used to access and retrieve ontology definitions and relationships from disparate linked ontologies. For example, each of the S, P, and O of the triple may be stored as a Universal Resource Identifier that identifies an RDF file. Accordingly, one may reference the URI of a first ontology as the object of an S-P-O triple while using a URI of a second ontology for the S.

FIG. 1 is a taxonomy browser user interface 100, according to various examples. User interface 100 includes search box 102, direction options 104, level selector 106, visualization selector 108, search execution element 110, and visualization 112. Visualization 112 may include the taxonomy of a concept object and may display the direct property relationships for a concept entered into search box 102 after clicking search execution element 110.

Figure 3:
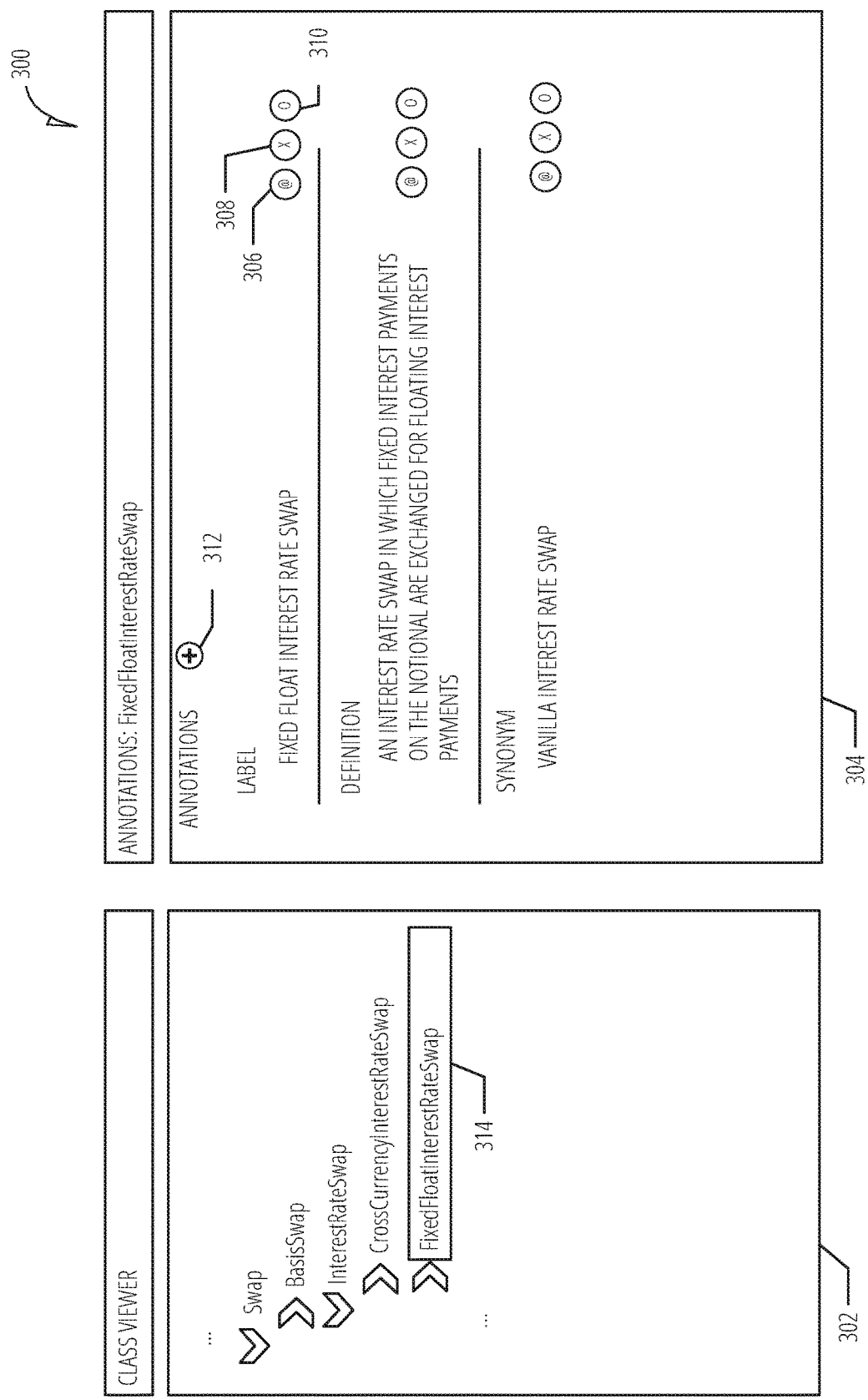
FIG. 3 is an ontology editing user interface, according to various examples.

Taxonomy browser user interface 100 may be hosted as a web application served from a web server (e.g., web server 304 with respect to FIG. 3). For example, a user may navigate to a URL to access the web application. In other examples, taxonomy browser user interface 100 may be part of a standalone application executing on a user's device (e.g., tablet, personal computer, etc.). The web application may include a number of views for visualizing ontology data. A user may select a view by using visualization selector 108. For example, "Concept Graph" may be selected to view concept relations user interface 200 in FIG. 2.

Search box 102 may be used to search for a concept in an ontology such as "Swap." Direction options 104 and level selector 106 may be used together to determine which concept objects to present from the taxonomy in response to the search. For example, selecting "up" retrieves superclass concept objects of the searched concept object and selecting "down" retrieves the subclass concept objects of the searched concept. Level selector 106 determines how far up or down the ontology graph to traverse. As illustrated, "2" levels and "down" results in the subclasses of "Swap" and the subclasses of the subclasses of "Swap" being presented.

The arrows in user interface 100 indicate the direct property relationship. Thus, "Interest Rate Swap" is a "Swap." A concept object may have more than one direct property relationship. For example, the "Float Float Interest Rate Swap" is a "Interest Rate Swap" and a "Basis Swap."

To generate visualization 112, a graph database query language such as SPARQL—a recursive acronym meaning SPARQL Protocol and RDF Query Language—may be used to retrieve all subclasses of a concept object:

select ?subclass where {
    ?subclass rdfs:subClassOf* :a
}

If multiple levels are used, the query may be repeated for each subclass. SPARQL may also be used to retrieve the depth of any returned classes. The results may also be fed into various statistical and visualization packages (e.g., using a SPARQL package with R in combination with the igraph library) to generate the visualization in FIG. 1. Other queries and visualization techniques may be used without departing from the scope of this disclosure.

FIG. 2 is a concept relations user interface 200, according to various examples. User interface 200 includes search box 202, direction options 204, level selection 206, visualization selector 208, and search execution element 210, and semantic graph visualization 212. User interface 200 may be presented in response to a selection of "Concept Graph" in visualization selector 208. In contrast to a taxonomy graph as illustrated in FIG. 1 as visualization 112 that illustrates the direct property relationship, user interface 200 may display the semantic property relationships within semantic graph visualization 212.

Direction options 204 and level selection 206 may be used to determine which properties of the concept entered in search box 202 are presented in semantic graph 212. Semantic graph 212 may be generated in a similar manner as the taxonomy graph of FIG. 1. For example, a SPARQL query may executed and the results may be visualized using igraph. As illustrated, semantic graph 212 is only presenting a subset of the semantic property relationships.

FIG. 3 is an ontology editing user interface 300, according to various examples. User interface 300 includes class hierarchy viewer 302, annotation editor 304, web link 306, delete option 308, edit option 310, add annotation option 312, and selected concept 314. Although user interface 300 is illustrated as a set of adjacent interface panes, other layouts may be used without departing from the scope of this disclosure. Additional interface panes may be used as well.

For example, user interface 300 may include an interface pane showing the relationships (semantic or otherwise) of selected concept 314.

The data presented in user interface 300 may be retrieved based on SPARQL queries, in various examples. Class hierarchy viewer 302 may display each of the concept objects in an ontology. Only a portion of the classes in an ontology are shown in class hierarchy viewer 302 for readability purposes. The hierarchy of the "Swap" concept object is partially presented. Each indentation in class hierarchy viewer 302 may correspond to a level of the hierarchy. For example, "Interest Rate Swap" and "Basis Swap" are both subclasses of "Swap." It may be observed that concept objects in class hierarchy viewer 302 correspond to the taxonomy visualization in FIG. 1.

A concept object may be associated with one or more annotations. An annotation may be stored as a free-text relationship with the concept object. Annotations may take many forms. For example, the "Fixed Float Interest Rate Swap" object has three annotations in annotation editor 304, a label, a definition, and a synonym. Accordingly, an annotation may be expressed in the S-P-O format as ["Fixed Float Interest Rate Swap"; has a; label]. New annotations may be added by a user selecting add annotation option 312. A menu may be presented in response to the selection in which types of annotations are presented.

Each annotation also includes a set of icons: web link 306, delete option 308, and edit option 310. Web link 306 may be a URL that includes additional information about the annotation. For example, web link 306 in a definition annotation may include a link to a further definition (e.g., at Investopedia, Wikipedia, etc.). As discussed further herein, a web link may be scraped and included in a corpus of training data. In some examples, the scraped definition is added to the annotation. Delete option 308 and edit option 310 may be used to delete and edit, respectively, an existing annotation.

As an example, consider a user has entered a concept in a search interface such as search box 102 in FIG. 1. The searched concept may not exist in an ontology; however, the searched concept may be semantically similar to a concept that does exist. For example, a user may search for "vanilla interest rate swap," which may not exist as a separate concept in a financial ontology. As illustrated in FIG. 3 "vanilla interest rate swap" may be a synonym. In some other instances, however, the searched concept may not even be listed as a synonym. In such instances it may be difficult to determine what concept data, if any, to retrieve to generate a taxonomy or relationship graph. Word embeddings may be computed based on a corpus of training data in order to suggest a concept for searched concepts that are not present in an ontology.

Figure 4:
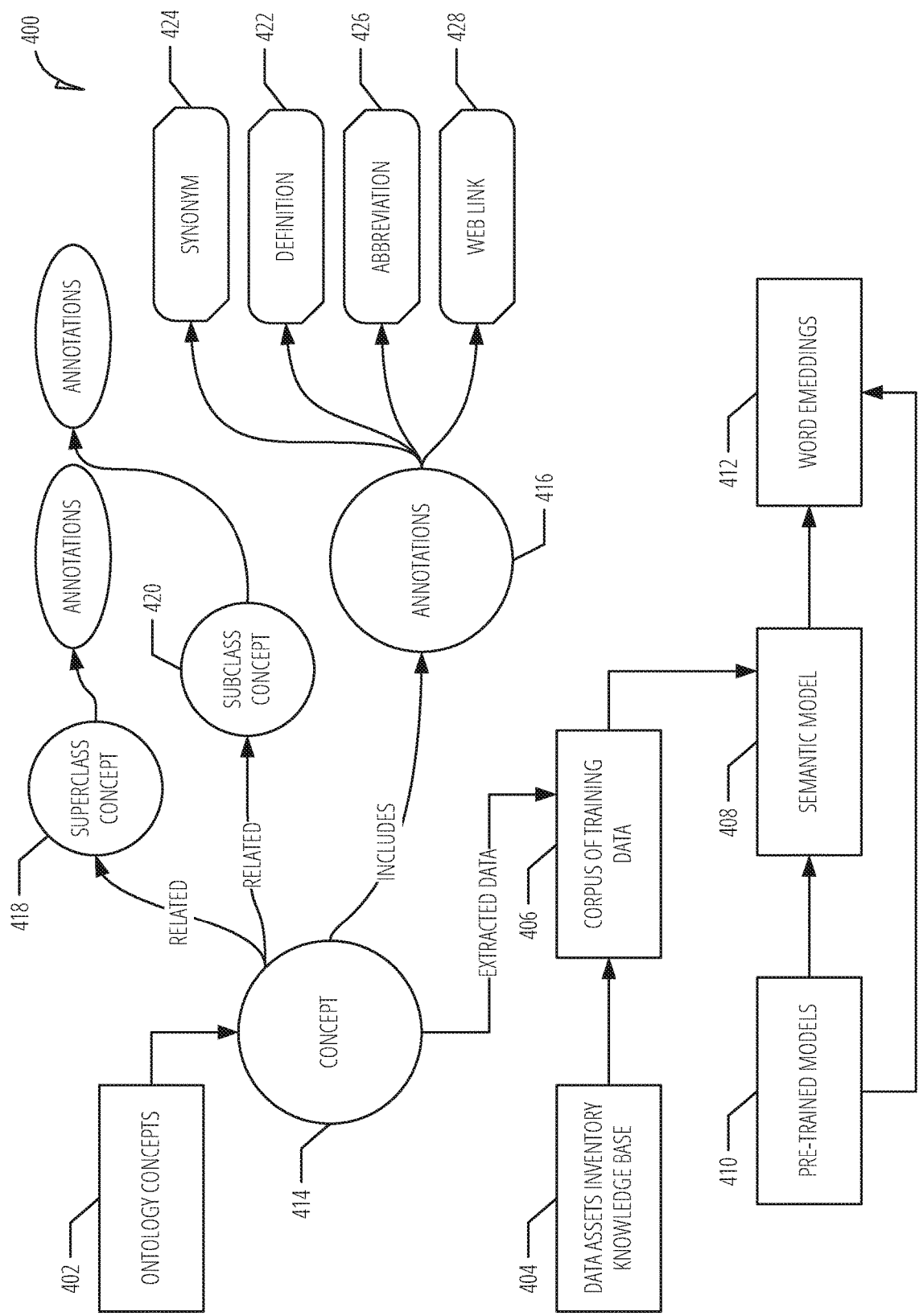
FIG. 4 is a conceptual process diagram of training a neural network to produce word embeddings, according to various examples.
Figure 5:
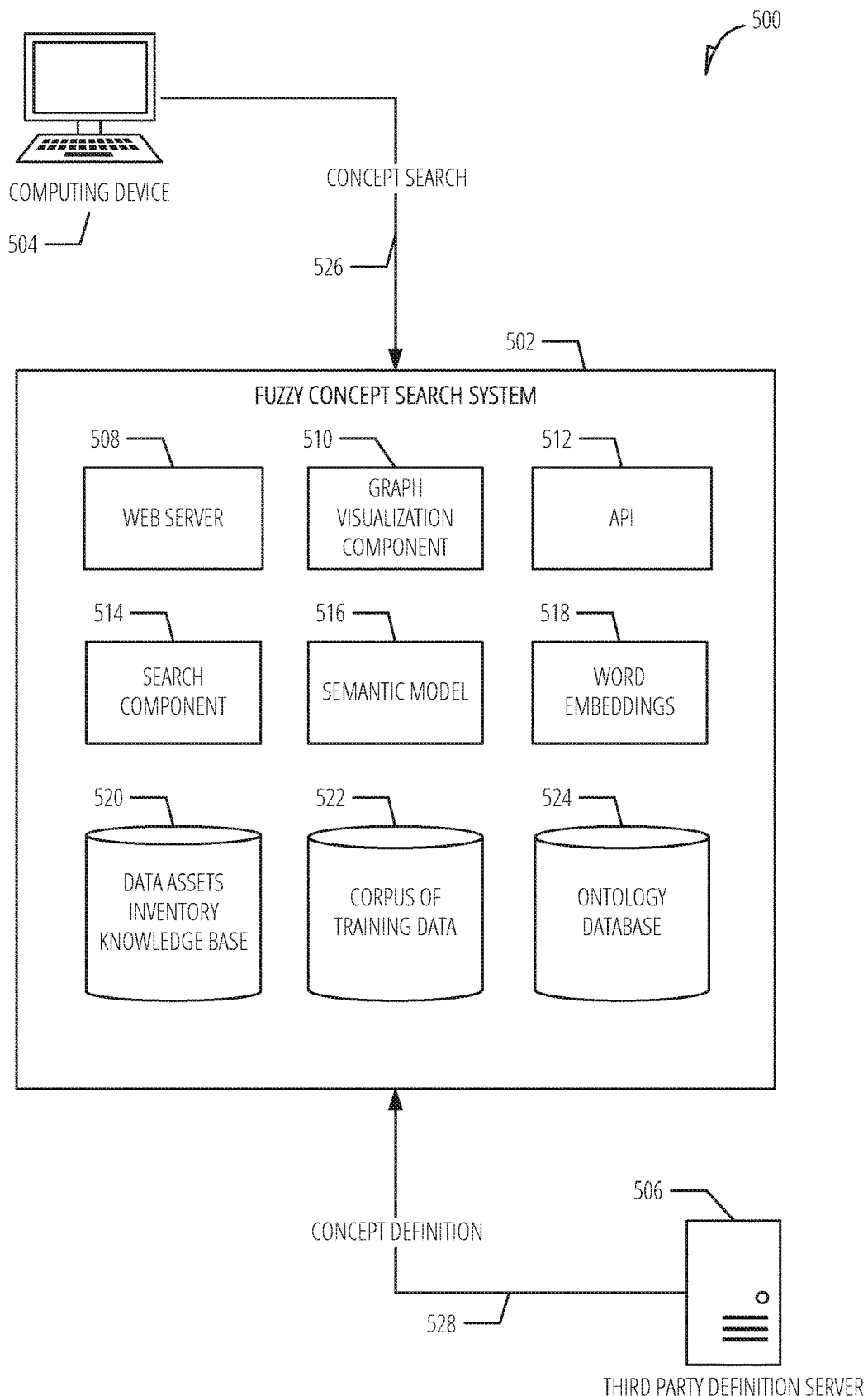
FIG. 5 is a diagram illustrating a schematic representation of components to generate word embeddings, according to various examples.

FIG. 4 is a conceptual process diagram 400 of training a neural network to generate word embeddings, according to various examples. The illustrated process may be performed by one or more with components of a system such as illustrated in FIG. 5.

Diagram 400 includes ontology concepts 402, data assets inventory knowledge base (KB) 404, corpus of training data 406, semantic model 408, pre-trained models 410, word embeddings 412, concept 414, superclass 418, and subclass 420, annotations 416, definition 422, synonym 424, abbreviation 426, and web link 428.

The accuracy of word embeddings 412 may be based on a number of factors including, but not limited to, the training data, the model, and the parameters of the model. The model and parameters may often be less impactful on the accuracy than the training data itself. If the training data is inaccurate, incomplete, or biased, then no model tuning may save the end results.

Diagram 400 illustrates an example process to compile corpus of training data 406 to produce word embeddings that capture the semantic similarity between concepts in the ontology (e.g., concept labels) and phrases that may not appear directly in the ontology. Diagram 400 illustrates a process of obtaining training data for a single concept, concept 414. Compiling the entire corpus of training data 406 may include iterating through each concept in ontology concepts 402 and performing the same process.

Data for concept 414 may be retrieved by formulating a query to the graph database (e.g., using a SPARQL query). The query may request the subclasses and superclasses of concept 414, which are illustrated as superclass concept 418 and subclass concept 420. The same, or an additional query, may be made to retrieve annotations 416 of concept 414. Annotations 416 may include synonym 424, definition 422, abbreviation 426, and web link 428. The annotations of superclass concept 418 and subclass concept 420 may also be retrieved. Retrieving the annotations may also include scraping data indicated in web link 428.

The text in each of annotations sets—annotations 416 and the annotations for superclass concept 418 and annotations 416—may be extracted and compiled as part of corpus of training data 406. In order to more accurately capture the semantic similarities between terms the extracted data may be formatted in a variety of ways. The formatting may occur during a training phase of semantic model 408 or during the extraction. For example, because synonym 424 on its own may provide no indication that it is a synonym or contextually related to concept 414, a sentence may be generated in the form of "[Synonym] is the same as [Concept Label]" or a word pair "[Synonym]:[Concept Label]." Similarly, a sentence may be constructed for the definition "[Concept Label] is [Concept Definition]." Similar sentence(s) may be constructed for the abbreviation 426.

In another example, a set of training data may be generated for each synonym 424 that mirrors that of concept 414. For example, consider concept 414 has a label of "Fixed Float Interest Rate Swap" and synonym 424 is "Vanilla Interest Rate Swap." Text may be compiled as if the concept label was actually "Vanilla Interest Rate Swap." Accordingly, sentences may be constructed such as "[Synonym] is [Concept Definition]." By creating the mirrored data sets, the word embedding for synonym 424 may be similar to that of concept 414.

Sets of training data may also be generated for relational database columns associated with concept 414. Sometimes a user may search for a concept using the name of a column that is associated with the concept from a relational database. Sometimes the user may not even be aware that what the user knows as the concept name is actually the column name.

For example, consider the concept of a credit card account number. Each line of business of organization may internally refer to a credit card account number in different ways such as "credit card number," "CC number," or "Credit Account Number." In some instances, it may be not be readily discernable that a column name even relates to a credit card number (e.g., "CC_NUM").

Furthermore, relational databases and graph databases may be structured differently making mapping between the two difficult. A relational database (RDB) to RDF mapping proposed W3C standard exists called R2RML. One purpose of R2RML is to facilitate a map of existing relational data as encapsulated in one or more databases—to the RDF data model. The input for an R2RML mapping is a logical table that may be a base table, a view, or a valid SQL query. The output of the R2RML is a mapping of the logical table to a RDF using a triple map. A triple map is a rule that takes each row in one of the logical tables to an RDF triple. The rule may have two components, the subject map and a multiple predicate-object map, which may be made up of predicate maps and object maps. The triple for a given database row may be formulated by combining the subject map with a predicate map and an object map.

Data assets inventory KB 404 may include a R2RML mapping between an organization's infrastructure (e.g., databases and tables) and an ontology. Accordingly, the map may contain all of the column names and their associated ontology concept. The triples in the R2RML map may be used as sentences for training data in corpus of training data 406. In some examples, a similar process as described above—for a concept's synonyms may be used. Thus, a sentence may be constructed for a definition "[Column Name] is [Concept Definition]."

Semantic model 408 may use corpus of training data 406 to generate word embeddings 412. In some examples, pre-trained models 410 include a set of word embeddings that may be used as a starting point for semantic model 408 before corpus of training data 406 is applied. In some example, pre-trained models 410 may be used as a separate set of word embeddings. Semantic model 408 may be implemented in a variety of ways, including but not limited to, Word2Vec, GloVe, fastText, and conceptnumberbatch. In some examples, semantic model 408 may be a shallow neural network with a single hidden layer (e.g., Word2Vec) or a distributional semantic model (e.g., GloVe). Regardless of the precise semantic model used, the result of training the model is a set of word embeddings 412 for words in corpus of training data 406.

Word2vec is an example technique that generates word embeddings (e.g., vector representations) of a vocabulary of words. The number of features for each word embedding (e.g., how many dimensions in the vector) may be configurable. This technique first forms a "one-hot" or 1-of-N encoding from a vocabulary of words, which may be based on a corpus of text such as corpus of training data 406. So, if the vocabulary includes [king, queen, man, women], king may be encoded in a vector of [1, 0, 0, 0], queen as [0, 1, 0, 0] and so forth. Each vector may only have a single '1' and the rest '0's. Once each word has a vector representation, mathematical calculations may be made such as v(King)–v(Man)+v(Woman) may approximately equal v(Queen). Furthermore, the word embeddings may be used to find semantically similar words.

A neural network may be used to generate a word embedding, of N features, for each of the words in the vocabulary. The neural network may include a single fully connected hidden layer with N×V nodes. The output layer may be the same size as the input layer four nodes continuing the example above. A matrix of size V×N may connect the input layer to the hidden layer and a matrix N×V connections may connect the nodes of the hidden layer to the output layer. The SoftMax function may be used to translate the output layer into a series of probabilities that add up to one based on the corpus of text and given vocabulary.

The neural network may be trained by using word (or phrase) pairs (context, target) from corpus of training data 406. In some examples, the vocabulary of terms may include known multi-word phrases such as the concept labels in the ontology. The neural network may have a window parameter that indicates how far from a "center word" pairs should be generated. The words in the window may be considered contextual terms for the center word.

Consider the phrase "Ontologies can enhance neural word embeddings with extra precision" with a two-word window. The underlined phrase may be considered a single "word." Pairs may be created by selecting each word in the sentence and going forward or backward (respecting stops like periods) according to the window. So, when "ontologies" is the center word, word pairs of [Ontologies, can] and [Ontologies, enhance] may be created. When "neural word embeddings" is the center word, pairs would include [neural word embeddings, can], [neural word embeddings, enhance], [neural word embeddings, with], and [neural word embeddings, extra].

After training, the rows of the weight matrix between the input layer and the hidden layer are the word embeddings. For example, if the one-hot-encoded of "neural word embeddings" was the $355^{th}$ position (e.g., [0, 0, 0, . . . , 1, . . . ) the word embedding would be the $355^{th}$ row of the weight matrix: 1st row [50, 23, 34, 23, . . . ]2nd row [34, 34, 87, 34, . . . ] . . . 355th row [97, 48, 27, 54, . . . ]. Thus, in effect, the weight matrix becomes a lookup table for the word embeddings.

A distributional semantic model like GloVe (global vectors for word representation) may apply an unsupervised learning algorithm that generates a co-occurrence matrix. GloVe looks at how many times a target word appears in the context (e.g., a window size or sentence) of a context word. GloVe may parse corpus of training data 406 to obtain these counts. After parsing, the training objective of GloVe yields word embeddings such that their dot product equals the logarithm of the words' probability of co-occurrence.

FIG. 5 is a diagram 500 illustrating a schematic representation of components to generate word embeddings, according to various examples. Diagram 500 includes fuzzy concept search system 502, computing device 504, and third-party definition server 506. Fuzzy concept search system 502 may include web server 508, graph visualization component 510, Application Programming Interface (API) 512, search component 514, semantic model 516, word embeddings 518, data assets inventory knowledge base 520, corpus of training data 522, and ontology database 524. Diagram 500 further illustrates computing device 504 transmitting concept search 526 to fuzzy concept search system 502 and third-party definition server 506 transmitting concept definition 528 to fuzzy concept search system 502.

Fuzzy concept search system 502 may be used to implement the process depicted in FIG. 4. For example, semantic model 516, word embeddings 518, data assets inventory knowledge base 520, corpus of training data 522 may correspond to semantic model 408, word embeddings 412, data assets inventory KB 404, and corpus of training data 406, respectively. Ontology database 524 may store ontology concepts 402 in various examples.

For illustration purposes, fuzzy concept search system 502 is illustrated as set of separate items (e.g., web server 508, graph visualization component 510, API 512, search component 514, semantic model 516, and word embeddings 518). However, the functionality of an individual items may be performed by a single component. A component may represent computer program code that is executable by a processing unit (e.g., a core of a general-purpose computer processor, a graphical processing unit, an application specific integrated circuit, etc.) The program code may be stored on a storage device and loaded into a memory of the processing unit for execution. Portions of the program code may be executed in a parallel across multiple processing units. Execution of the code may be performed on a single device or distributed across multiple devices. In some example, the program code is executed on a cloud platform (e.g., MICROSOFT AZURE® and AMAZON EC2®) using shared computing infrastructure.

Fuzzy concept search system 502 includes a number of data stores (e.g., data assets inventory knowledge base 520, corpus of training data 522, and ontology database 524). The data stores may be organized and stored in a variety of manners. The specific storage layout and model used in a data store may take a number of forms indeed, a data store may utilize multiple models. The data stores may be, but are not limited to, a relational database (e.g., SQL), non-relational database (NoSQL) a flat file database, object model, document details model, graph database, shared ledger (e.g., blockchain), or a file system hierarchy. The data stores may store data on one or more storage devices (e.g., a hard disk, random access memory (RAI), etc.). The storage devices may be in standalone arrays, part of one or more servers, and may be located in one or more geographic areas.

API 512 may provide a method for computing processes in fuzzy concept search system 502, computing device 504, and third-party definition server 506 to exchange data. For example, API 512 may include a web-based API that permits communications between two or more computing devices such as a client and a server. The API may define a set of HTTP calls according to Representational State Transfer (RESTful) practices. For examples, A RESTful API may define various GET, PUT, POST, DELETE methods to create, replace, update, and delete data stored on in a database on the server. API 512 may be used to retrieve data from ontology database 524 and present the data on computing device 504.

API 512 may also define function calls into semantic model 516 and 518. For example, a function call may be defined with a single term parameter such as "retrieve_most_similar(TERM)." In response, API 512 may return the give most similar words of phrases based on cosine similarity included in word embeddings 518. An optional parameter may indicate how many results to return. Semantic model 516 may also include API calls for training.

Although not depicted, the servers and components of diagram 500 may communicate via one or more networks. A network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. The network may include a single local area network (LAN) or wide-area network (WAN), or combinations of LAN's or WAN's, such as the Internet.

Computing device 504 may be, but is not limited to, a smartphone, tablet, laptop, multi-processor system, microprocessor-based or programmable consumer electronics, game console, set-top box, or another device that a user utilizes to communicate over a network. In various examples, a computing device includes a display module (not shown) to display information (e.g., in the form of specially configured user interfaces). In some embodiments, a computing device may comprise one or more of a touch screen, camera, keyboard, microphone, or Global Positioning System (GPS) device. Computing device 504 may use a web client or other application to communicate with fuzzy concept search system 502 and transmit concept search 526.

Web server 508 may be used to exchange information with users via a network such as the Internet. Although generally discussed in the context of delivering webpages via the Hypertext Transfer Protocol (HTTP), other network protocols may be utilized by web server 508 (e.g., File Transfer Protocol, Telnet, Secure Shell, etc.) A user may enter in a uniform resource identifier (URI), such as a host name, into a network browser (e.g., the INTERNET EXPLORER® web browser by Microsoft Corporation or SAFARI web browser by Apple Inc.) that is associated with the logical location (e.g., an Internet Protocol address) of fuzzy concept search system 502. In response, web server 508 may transmit a web page that is rendered on a display device of computing device.

Web server 508 may enable a user to interact with one or more web applications provided in a transmitted web page. A web application may provide user interface (U) components that are rendered on a display device of a computing device. For example, fuzzy concept search system 502 may host a web application that presents web pages for searching ontology database 524 such as depicted in FIG. 1 and FIG. 2.

The user may interact (e.g., select, move, enter text into) with the UI components, and, based on the interaction, the web application may update one or more portions of the web page. For example, a user may select a different level of ontology concepts to display and graph visualization component 510 may generate a new graph for display-using techniques described previously. A web application may be executed in whole, or in part, locally on a client device. The web application may populate the UI components with data from external sources or web server in various examples. The web application may issue API calls to retrieve the data. Conversely, data entered by a user into a UI component may be transmitted using an API call back to web server 508.

Third party definition server 506 may host its own web pages that contain definitions of concepts in ontology database 524. When an annotation includes a web link, fuzzy concept search system 502 may retrieve data located at the web link that includes concept definition 528. The retrieved definition may be used for corpus of training data 522.

Figure 6:
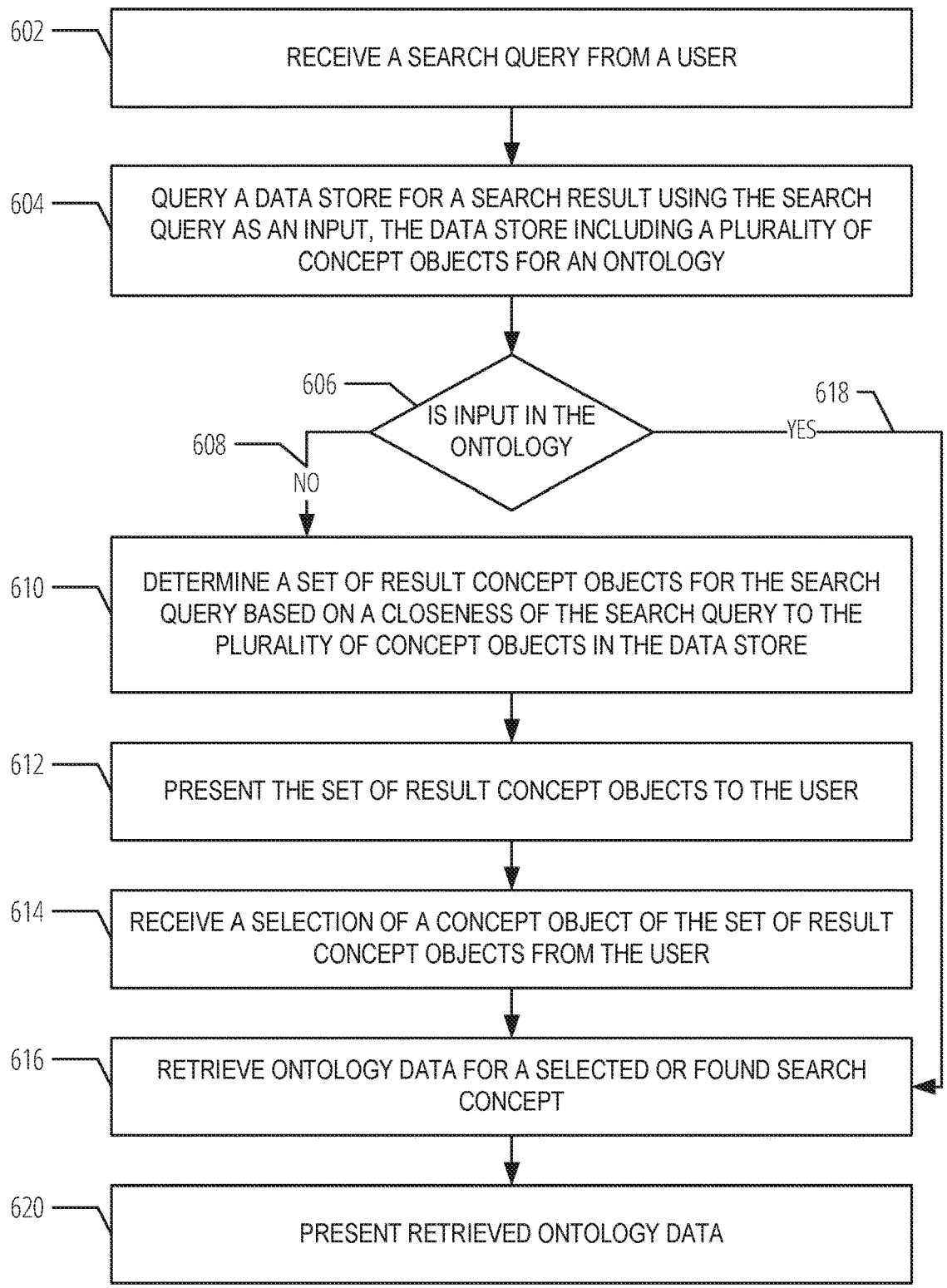
FIG. 6 is a flowchart illustrating a method to suggest a concept based on an inaccurate search, according to various examples.

FIG. 6 is a flowchart illustrating a method to suggest a concept based on an inaccurate search, according to various examples. The method is represented as a set of blocks that describe operations 602-620 of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 6. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

At operation 602, in various examples, a search query is received from a user. The search query may be received at a processing computing system such as illustrated as fuzzy concept search system 502. The search query may be received from data entered into a search input box as part of a webpage. An example interface of the webpage is presented in FIG. 1. The search query may be for a concept in an ontology. In various examples, the search query is a column name of a database table.

At operation 604, in various examples, a data store is queried for a search result using the search query as an input. The data store may be a graph database that stores concept objects for an ontology. The graph database may also include annotations for each of the concept objects.

At operation 606, a processing system may determine if the input (e.g., the search query) is in the data store based on the results of the query in operation 604. A concept may be considered in the data store if a concept label identically matches the input.

In various examples, spellchecking may be performed on the input before the query in operation 604. The vocabulary used for the spellcheck may include concept labels in the ontology. A suggested correction in one or more words of the input may be presented to the user if it appears that one or more of the terms in the input was misspelled. A threshold may be used based on the number of character changes required between an input word in a word in the vocabulary to determine it word was potentially misspelled. If the number of changes is above the threshold, then it may be decided that the board was not misspelled in the query may be submitted to the data store.

When it is determined that input is not in the ontology (operation 608), flow may continue to operation 610. At operation 610, in various examples, a set of result concept objects for the search may be determined. The set of result concept objects may be based on the closeness of the search query to the plurality of concept objects in the data store. Closeness may be determined according to word embeddings from a semantic model trained using data originating in the ontology. For example, the word embeddings may be rows in a weight matrix between input layer and a hidden layer in a shallow neural network. The neural network may have been trained based on corpus of training data that includes the concept objects and their annotations.

Each word embedding may be a vector. Closeness may be calculated using cosine similarity between the word embedding of the search query and the word embeddings from the semantic model. In various examples, an API may be used to retrieve the most similar concept objects to the search query. In some examples, only the most similar concept object is retrieved. Additionally, in an example, vocabulary terms in the word embeddings that are not also concept objects are not included in the retrieve results. Thus, even if the search query is determined to be most close to term C, if C is not a concept object of the ontology, it may be ignored.

At operation 612, in various examples, the set of result concept objects is presented to the user. Presenting may include a prompt that indicates the concept labels of the concept objects and asks the user if the user meant one of the concept objects in the set of results. For example, the prompt may appear beneath the input search box that received the search query.

At operation 614, in various examples, a selection is received of a concept object in the set of concept objects. For example, the user may click on the name of one of the set of concept objects presented. In response to the selection, at operation 616, ontology data for the selected concept object may be retrieved. If the input was found to have been in the ontology (operation 618), ontology data for the found concept object maybe retrieved. The type and amount of retrieved ontology data may depend on user selections such as the levels up or down from the concept object and whether a taxonomy or semantically related concept objects has been requested. Examples of retrieved ontology data are discussed with respect to FIG. 1 and FIG. 2. The retrieved data may be presented (e.g., in a graph format) for the selected concept object at operation 620.

Figure 7:
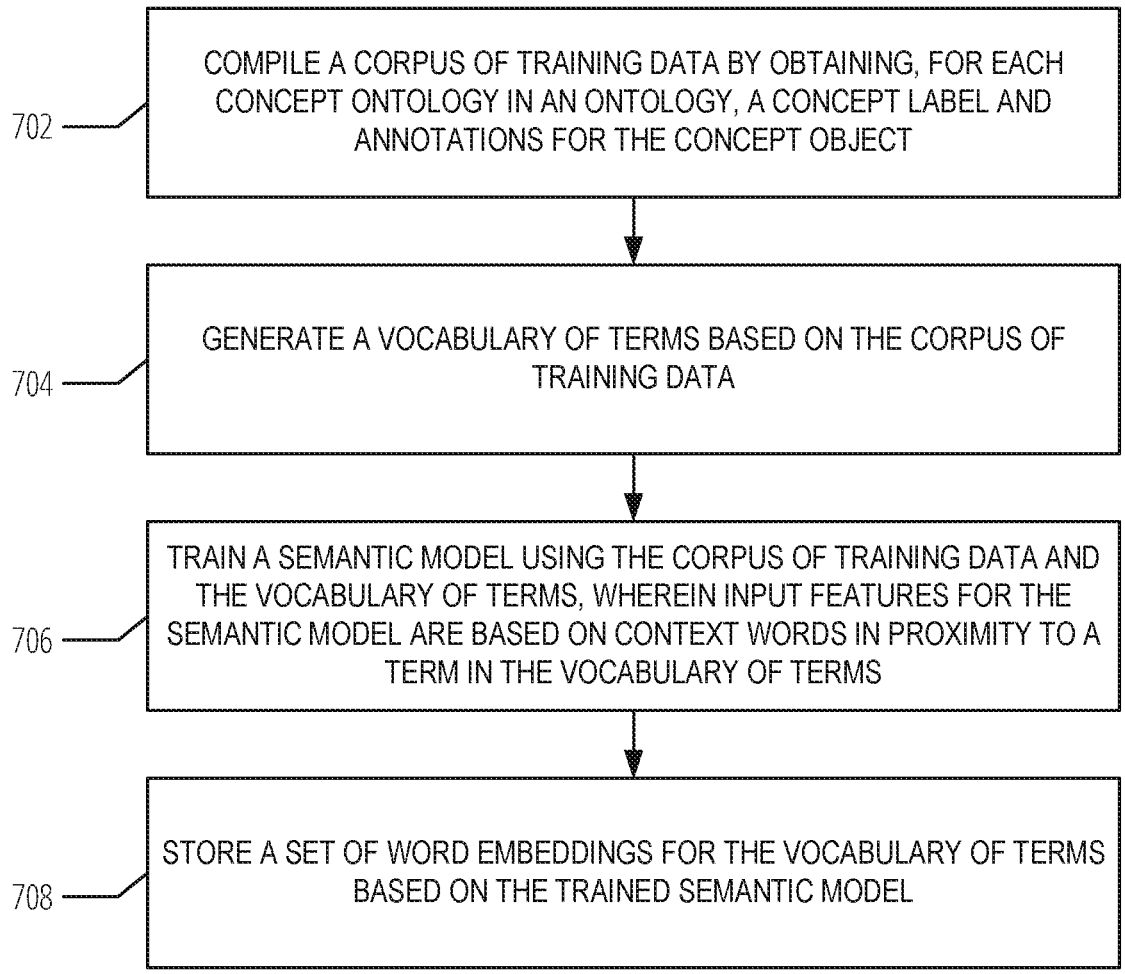
FIG. 7 is a flowchart illustrating a method to generate word embeddings, according to various examples.

FIG. 7 is a flowchart illustrating a method to generate word embeddings, according to various examples. The method is represented as a set of blocks that describe operations 702-708 of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 7. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

At operation 702, in various examples, a corpus of training data may be compiled by obtaining, for each concept object in an ontology, a concept label and annotations describing the concept object. For example, a graph database that stores triples defining an ontology may be iterated through to obtain the data for each concept object. The compiling may be done automatically via a series of queries to the graph database.

In various examples, compiling may include, for a respective concept object in the graph database, retrieving a set of column name identifiers from a set of relational databases that have been identified as data sources for the respective concept object.

In various examples, annotations may include a definition of the respective concept object. An annotation may include a URL with a definition of the respective concept object. In various examples, compiling the corpus of training data include may include scraping the definition from the URL.

Compiling the corpus of training data may include, for a respective concept object, retrieving data associated with a concept object related to the respective concept object. The concept object related to the respective concept object may be a superclass of subclass concept of the respective concept object At operation 706, in various examples, a vocabulary of terms is generated based on the corpus of training data. For example, each unique word in the corpus of training data may be a term. In some examples, each concept label from the ontology is a term. In some examples, some words may be excluded from the vocabulary (e.g., "and"). The vocabulary may be generated according to an algorithm defined by a natural language processing algorithm or semantic model.

At operation 708, in various examples, a semantic model is trained using the corpus of training data and the vocabulary of terms. The semantic model may be, but is not limited to, Word2Vec, GloVe, fastText, and conceptnumberbatch. Input features of the semantic model may be based on context words in proximity to a term in the vocabulary of terms. The limit of proximity may be defined according to a window of X words surrounding the term. Context may refer to word within the window. The format and number of input features may be defined as a parameter of the semantic model.

In various examples, the semantic model is a neural network. An input layer of the neural network and an output layer of the neural network may be of an array size equivalent to the number terms in the vocabulary of terms. The neural network may include a single hidden layer of neurons with no activation function. The number of neurons may be set according to a hyperparameter of the neural network. Training the semantic model may include using word pairs from the corpus of training data (e.g., using continuous bag of words or skip-grain), a first word of a word pair being an input and a second word of the word pair being an expected output. In various examples, each respective row of the weight matrix between the input layer and the single hidden layer of neurons is a respective word embedding of the set of word embeddings for a respective term in the vocabulary of terms.

At operation 708, in various examples, a set of word embeddings for the vocabulary of terms is stored based on the trained semantic model. For example, each row of the weight matrix may be stored as a word embedding for the vocabulary of terms. An API may be defined that permits querying the stored word embedding for the closest term in the vocabulary given an input term. Closeness may be defined by the cosine similarity between two different word embeddings.

Example Computer System

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 8:
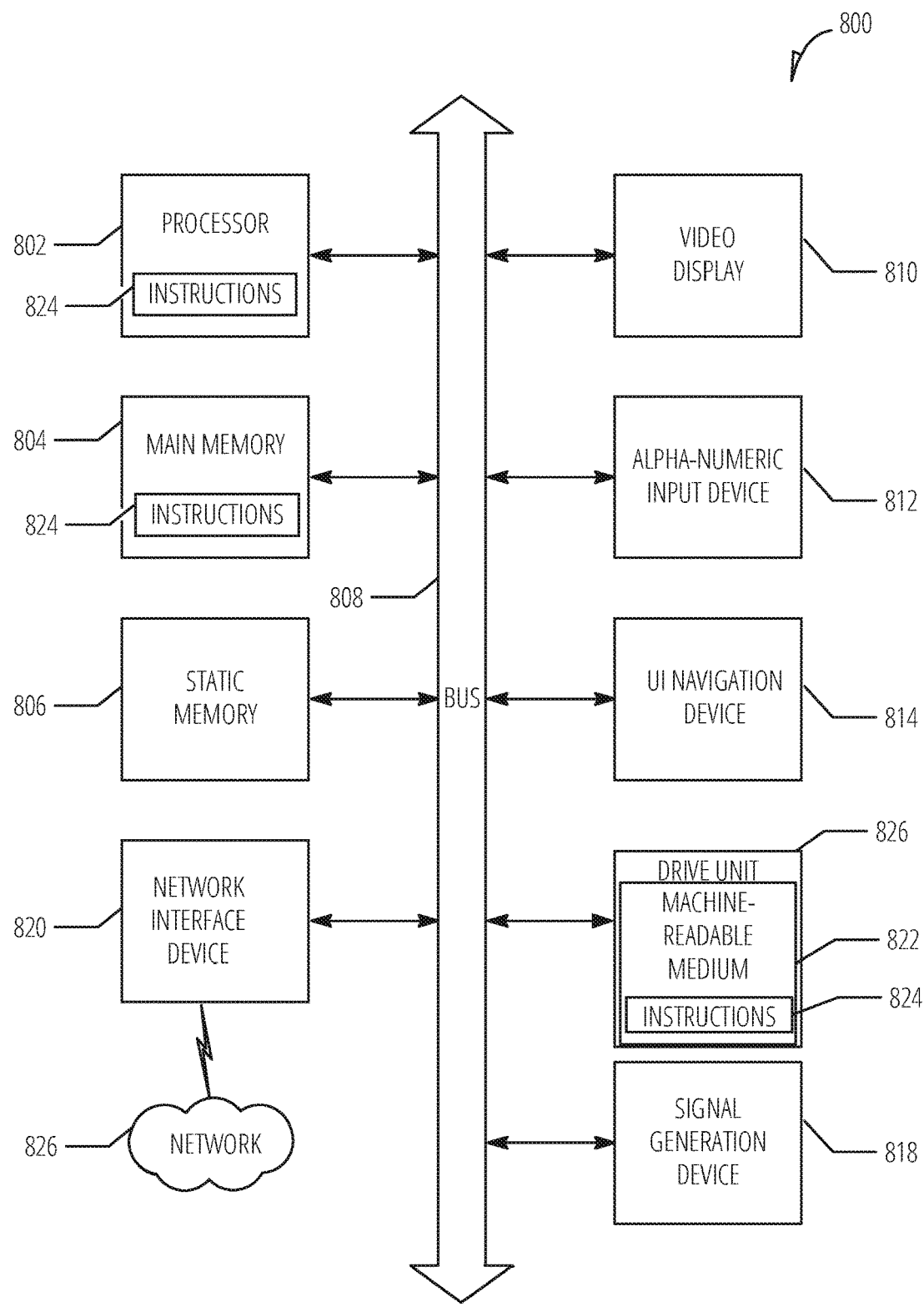
FIG. 8 is a block diagram illustrating an example machine upon which any one or more of the techniques (e.g., methodologies) discussed herein may be performed, according to an example embodiment.

FIG. 8 is a block diagram illustrating a machine in the example form of a computer system 800, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are incorporated into a touch screen display. The computer system 800 may additionally include a storage device 816 (e.g., a drive unit), a signal generation device 818 (e.g., a speaker), a network interface device 820, and one or more sensors (not shown), such as a global positioning system (GPS) sensor, compass, accelerometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 8G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A computer-implemented method comprising:
    compiling, using at least one processor, a corpus of training data by obtaining, for each respective concept object in an ontology, a respective concept label and respective annotations describing the respective concept object;
    generating a vocabulary of terms based on the corpus of training data;
    training a semantic model using the corpus of training data and the vocabulary of terms, wherein input features for the semantic model are based on context words in proximity to a term in the vocabulary of terms, wherein the semantic model is a neural network and wherein an input layer of the neural network and an output layer of the neural network are of a size equivalent to a number terms in the vocabulary of terms; and
    wherein training the semantic model includes using word pairs from the corpus of training data, a first word of a word pair being an input and a second word of the word pair being an expected output; and
    storing a set of word embeddings for the vocabulary of terms based on the trained semantic model.

2. The computer-implemented method of claim 1, wherein the neural network includes a hidden layer of neurons with no activation function.

3. The computer-implemented method of claim 2, wherein each respective row of a weight matrix between the input layer and the single hidden layer of neurons is a respective word embedding of the set of word embeddings for a respective term in the vocabulary of terms.

4. The computer-implemented method of claim 1, wherein the respective annotations include a definition of the respective concept object.

5. The computer-implemented method of claim 1, wherein the respective annotations include a URL with a definition of the respective concept object and wherein compiling the corpus of training data includes scraping the definition from the URL.

6. The computer-implemented method of claim 1, wherein compiling the corpus of training data includes, for the respective concept object, retrieving a set of column name identifiers from a set of relational databases that have been identified as a data sources for the respective concept object.

7. The computer-implemented method of claim 1, wherein compiling the corpus of training data includes, for the respective concept object, retrieving data associated with a concept object related to the respective concept object.

8. The computer-implemented method of claim 7, wherein the concept object related to the respective concept object is a superclass concept of the respective concept object.

9. A computer-implemented method comprising:
    receiving, at a processing computing system, a search query from a user;
    querying a data store for a search result using the search query as an input, the data store including a plurality of concept objects for an ontology;
    in response to the search result indicating a concept object for the input is not in the data store:
    determining a set of result concept objects for the search query based on a closeness of the search query to the plurality of concept objects in the data store, wherein closeness is determined according to word embeddings from a semantic model trained using data based on the ontology, wherein the semantic model is a neural network and wherein an input layer of the neural network and an output layer of the neural network are of a size equivalent to a number terms in a vocabulary of terms;
    presenting the set of result concept objects to the user; and
    receiving a selection of a concept object of the set of result concept objects from the user; and
    presenting data retrieved from the data store for the selected concept object.

10. A non-transitory computer-readable medium comprising instructions, which when executed by at least one processor, configure the at least one processor to perform operations comprising:
- compiling, using the at least one processor, a corpus of training data by obtaining, for each respective concept object in an ontology, a respective concept label and respective annotations describing the respective concept object;
- generating a vocabulary of terms based on the corpus of training data;
- training a semantic model using the corpus of training data and the vocabulary of terms, wherein input features for the semantic model are based on context words in proximity to a term in the vocabulary of terms,
  - wherein the semantic model is a neural network and wherein an input layer of the neural network and an output layer of the neural network are of a size equivalent to a number terms in the vocabulary of terms; and
  - wherein training the semantic model includes using word pairs from the corpus of training data, a first word of a word pair being an input and a second word of the word pair being an expected output; and
- storing a set of word embeddings for the vocabulary of terms based on the trained semantic model.

11. The computer-readable medium of claim 10, wherein the neural network includes a hidden layer of neurons with no activation function.

12. The computer-readable medium of claim 11, wherein each respective row of a weight matrix between the input layer and the single hidden layer of neurons is a respective word embedding of the set of word embeddings for a respective term in the vocabulary of terms.

13. The computer-readable medium of claim 10, wherein the respective annotations include a definition of the respective concept object.

14. A system comprising:
at least one processor; and
a storage device comprising instructions, which when executed by the at least one processor, configure the system to:
- compile a corpus of training data by obtaining, for each respective concept object in an ontology, a respective concept label and respective annotations describing the respective concept object;
- generate a vocabulary of terms based on the corpus of training data;
- train a semantic model using the corpus of training data and the vocabulary of terms, wherein input features for the semantic model are based on context words in proximity to a term in the vocabulary of terms,
  - wherein the semantic model is a neural network and wherein an input layer of the neural network and an output layer of the neural network are of a size equivalent to a number terms in the vocabulary of terms; and
  - wherein to train the semantic model, word pairs are used from the corpus of training data, a first word of a word pair being an input and a second word of the word pair being an expected output; and
- store a set of word embeddings for the vocabulary of terms based on the trained semantic model.

15. The system of claim 14, wherein the neural network includes a hidden layer of neurons with no activation function.

16. The system of claim 15, wherein each respective row of a weight matrix between the input layer and the hidden layer of neurons is a respective word embedding of the set of word embeddings for a respective term in the vocabulary of terms.

17. The system of claim 14, wherein the respective annotations include a definition of the respective concept object.

* * * * *

UNITED STATES PATENT AND TRADEMARK OFFICE
CERTIFICATE OF CORRECTION

PATENT NO. : 11,106,736 B1
APPLICATION NO. : 16/549202
DATED : August 31, 2021
INVENTOR(S) : Newman et al.

Page 1 of 1

It is certified that error appears in the above-identified patent and that said Letters Patent is hereby corrected as shown below:

In the Claims

In Column 16, Line 17, in Claim 3, before "hidden", delete "single"

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*